April 26, 1938.  E. BUGATTI  2,115,095
COUPLING DEVICE FOR RAILROAD VEHICLES
Filed May 16, 1935  9 Sheets-Sheet 1

Inventor:-
Ettore Bugatti
By Mauro + Lewis
Attorneys

April 26, 1938.  E. BUGATTI  2,115,095

COUPLING DEVICE FOR RAILROAD VEHICLES

Filed May 16, 1935   9 Sheets-Sheet 2

Fig. 3

Inventor:
Ettore Bugatti
By Mauro + Lewis
Attorneys

April 26, 1938.   E. BUGATTI   2,115,095
COUPLING DEVICE FOR RAILROAD VEHICLES
Filed May 16, 1935    9 Sheets-Sheet 3

Inventor:—
Ettore Bugatti
By Mauro + Lewis
Attorneys

April 26, 1938.  E. BUGATTI  2,115,095
COUPLING DEVICE FOR RAILROAD VEHICLES
Filed May 16, 1935    9 Sheets-Sheet 4

April 26, 1938. E. BUGATTI 2,115,095
COUPLING DEVICE FOR RAILROAD VEHICLES
Filed May 16, 1935 9 Sheets-Sheet 5

April 26, 1938. E. BUGATTI 2,115,095
COUPLING DEVICE FOR RAILROAD VEHICLES
Filed May 16, 1935 9 Sheets-Sheet 8

Fig. 17

Inventor:—
Ettore Bugatti
By Mauro + Lewis
Attorneys

April 26, 1938.  E. BUGATTI  2,115,095
COUPLING DEVICE FOR RAILROAD VEHICLES
Filed May 16, 1935   9 Sheets-Sheet 9

Patented Apr. 26, 1938

2,115,095

UNITED STATES PATENT OFFICE 2,115,095

COUPLING DEVICE FOR RAILROAD VEHICLES

Ettore Bugatti, Molsheim, France

Application May 16, 1935, Serial No. 21,869
In France May 19, 1934

11 Claims. (Cl. 105—3)

The present invention has for its object to provide a coupling device which is intended especially for railroad vehicles. This coupling device is arranged in such manner that the bodyworks of two vehicles coupled together cannot move transversely with respect to each other but that each of them can move about a longitudinal axis (rolling movements) and that, when running along a curve, these bodies can freely take an angular position with respect to each other.

The coupling device according to the present invention essentially comprises:

(a) A coupling beam which connects together the two adjacent axles or trucks of the vehicles and which is rigid in a direction transverse to the track;

(b) One or two guiding members compelled to remain vertical or substantially vertical by connection with this coupling beam; and (c) Coupling bars carried by the vehicles and provided at their ends with universal joints which are guided by the members stated under b.

This combination of elements permits of obtaining the result above stated.

The invention may be carried out in different manners. If both of the universal joints above mentioned are compelled, through a suitable connection, to remain at substantially the same height, or if they form a single device together, the coupling device according to the present invention has the further advantage of opposing relative displacements of the respective bodies of the two vehicles in the vertical direction.

The bodies of the vehicles rest upon the axles or the trucks through suspension devices permitting free working of these axles or trucks. If the vehicles are mounted on trucks, the usual connection through pivots between the frame and the trucks is done away with. The adjacent axles or trucks of the two vehicles coupled together form, in a way, owing to the fact that they are connected together by the coupling beam, a composite truck common to both of these vehicles.

When the system of wheels thus formed moves past a point where there is a slight local deviation of the track, for instance runs over a joint where the end of a rail is positioned slightly on the right or on the left of the corresponding end of the adjacent rail, the transverse displacement transmitted to the bodies through the guiding members and the coupling bars is greatly reduced, so that the bellows through which the vehicles can be connected together are subjected to much less considerable stresses. Furthermore, when running along a curve, the adjacent ends of the two bodies are displaced toward the inside of the curve.

In an embodiment of the invention, I combine with this coupling device one or several apparatus serving to wholly or partly propel one or both of the vehicles coupled together. These apparatus may be motors, motive power receivers, etc., and in the following description, for the sake of simplicity they will be called motors, or engines.

In this embodiment of the invention, these motors, and also a portion of the transmission gear interposed between the driving wheels and the members through which they are driven may be supported by the beam connecting together the adjacent trucks or axles of the two vehicles to be coupled together. As above explained, the weight of the frames or bodies of the vehicles is transmitted to the axles or trucks without the intermediary of said beam, and the motor or motors do not participate in the movements of the vehicle bodies with respect to said beams. The motor or motors are thus located at a place where they occupy but very little of the space available in the vehicle bodies, and, for practical purposes, it is possible to dispose them nearly wholly under the bellows through which the vehicle bodies communicate with each other, if such bellows are provided. However, even if the motors occupy a portion of the useful space, this portion is always smaller than the space occupied by the motors in the arrangements used up to this time. Furthermore, the portion of the useful space within the vehicle bodies that is occupied by the motors is of relatively little importance because it is close to the wheels and passengers avoid, whenever possible, to occupy seats located in the vicinity of the wheels. Finally, the arrangement above stated has the following advantages: the motors or engines are located closer to the members that are to be driven by them; consequently the transmission shafts or equivalent members are shorter and perturbations are less likely to occur; the displacements of these motors or engines in the vertical direction with respect to the wheels are generally of smaller amplitude than if these motors were carried by the vehicle body; finally the motors, which are as a rule very heavy are located as low as possible, that is to say in a position advantageous from the point of view of stability of the vehicles.

In the embodiment of the coupling device according to the invention in which the beam, instead of forming a rigid structure, consists of at least two portions jointed together about a horizontal axis, although being rigid in the transverse direction, the weight of the engines carried by the two jointed elements of the beam can be distributed between the frame of one of the vehicles and the corresponding truck or axle of the coupling device. It will be readily understood that a certain number of the advantages above mentioned is still retained with this arrangement.

I may also, according to the present invention, provide a coupling device in which the beam is made of two portions articulated with each other without impairing the transverse rigidity of the whole and in which each of these portions is suspended from the corresponding vehicle frame. In this case, the engines carried by the respective portions of the beam are suspended from the vehicle frame but the advantages resulting from their low position and their location close to the wheels are maintained. In this case, the coupling device has a modified form which is comprehended within the scope of the present invention, independently of the special arrangements provided for receiving the motor or motors.

According to another feature of the present invention, the coupling beam may serve to support the whole or a part of the load to be transmitted from the body of each vehicle to the corresponding axles or trucks. The load, or portion of the load, may be transmitted either rigidly or elastically from the body or frame of the vehicle to the coupling beam and either rigidly or elastically from said beam to the axles or trucks.

This modification of the coupling device can be applied for obtaining articulated trains or locomotives.

Preferably, the loads are transmitted to the midde part or in the vicinity of the middle part of the coupling beam.

In any case, the loads are transmitted to the coupling beam in such manner that they are preferably distributed evenly between the axles or trucks coupled together by said beam.

This embodiment of the coupling device according to the present invention has the advantage of being generally simpler than the first mentioned embodiment of the coupling device according to the present invention. This is due to the fact that, in this first embodiment, the precautions to be taken for ensuring the relative movability of the truck not only with respect to the body of the vehicle but also with respect to the coupling beam are often more difficult to observe in the case of the first mentioned embodiment than in the case of the last modification. When this relative movability is ensured by means of systems of shoes and slideways, no great difficulties are met with. On the contrary, the problem is more difficult to solve if, in order to reduce friction, it is desired to utilize rollers having a fixed axis.

Other features of the present invention will result from the following detailed description of specific embodiments thereof.

Preferred embodiments of the present invention will be hereinafter described with reference to the accompanying drawings, given merely by way of example, and in which.

Figure 1:
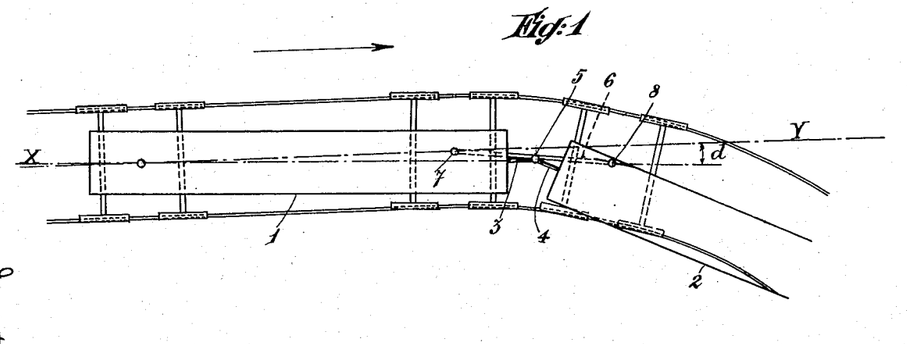
Fig. 1 is an explanatory diagram illustrating the principle of the invention.

In the explanatory view of Fig. 1, I have shown two vehicles running along a curve, these vehicles being of the type in which the body is supported by trucks. The bodies 1 and 2 of the vehicles are provided with coupling bars 3 and 4, respectively, which are rigidly fixed to said bodies and which are connected with each other at 5 by a universal joint. This joint is carried, in such manner as to be able to slide vertically, by a beam 6 coupling together the pivots 7 and 8 of the adjacent trucks of vehicles 1 and 2. The ordinary pivotal connection between the frames and the trucks is done away with, the frames resting merely on said trucks, preferably through springs, rolling or sliding races being interposed between the springs and the trucks.

Assuming that the vehicles move in the direction of the arrow, a lateral displacement $d$ of pivot 8 with respect to straight line XY corresponds to only a displacement $$\frac{d}{2}$$

of the universal joint 5. In the present instance of vehicles carried by trucks each provided with two axles, to each lateral local displacement of an axle equal to $a$, there corresponds, for the pivot of the truck, a displacement equal to $$\frac{a}{2}$$

and for the universal joint 5 a displacement equal to $$\frac{a}{4}$$

Consequently, when vehicles coupled together through the coupling device according to the present invention run along a track having small deviations in the transverse direction, for instance a track whereof two following rails are not exactly in line with each other, the shocks produced by these deviations are not so violent and the vibrations transmitted to the vehicle bodies are not so considerable as with previous coupling systems. When the vehicles enter a curve, the angular displacements of the bodies are not so great as with the ordinary coupling devices. Furthermore, the centrifugal reactions are more evenly distributed between the axles since they are first transmitted to the coupling beam, which acts as an equalizing bar. Finally, as the point of articulation 5 is brought upon a chord of the curve corresponding to the axis of the track, the bodies of the vehicles are displaced toward the inside of this curve and the same is true of the center of gravity. Consequently, the tendency to upsetting of the cars under the effect of the centrifugal force developed in curves is much reduced and the outer rail is less loaded than if the coupling device were of the usual type.

It will be readily understood that the advantages above mentioned remain, although to a slightly reduced extent, when each of the coupling bars 3, 4 corresponds to a universal joint guided along a member carried by the coupling beam. Of course, if these articulations are independent, the bodies of the vehicle can freely move with respect to each other in the vertical direction.

Figure 2:
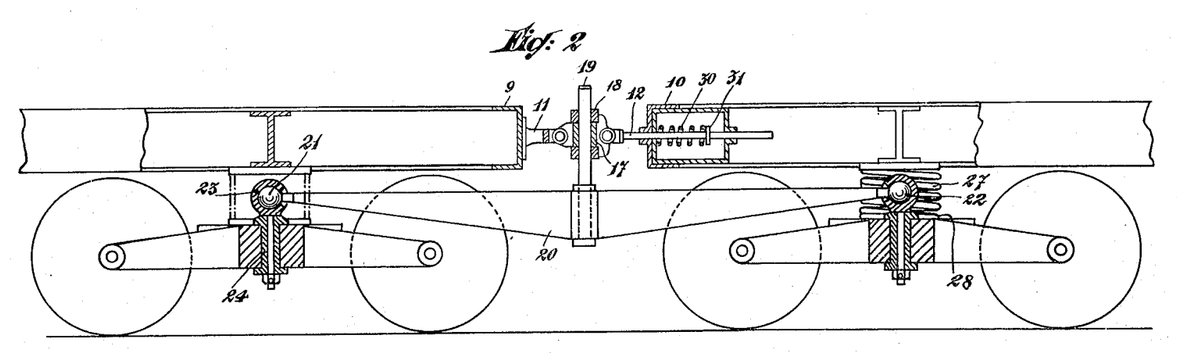
Fig. 2 is a vertical sectional view diagrammatically showing a first embodiment of the coupling device according to the present invention, together with the adjoining portions of the vehicles to be coupled together through this device.
Figure 3:
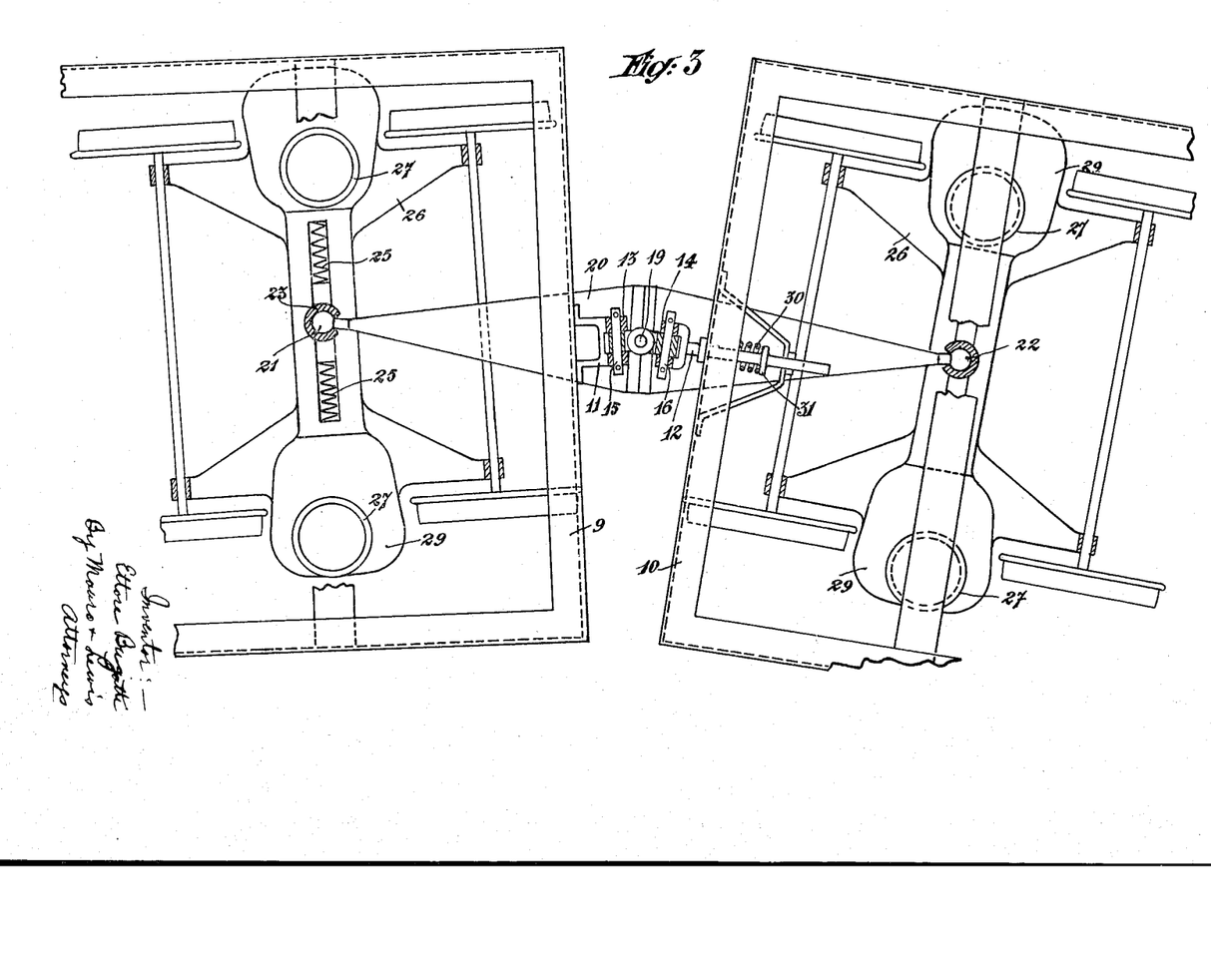
Fig. 3 is a plan view corresponding to Fig. 2.

In the embodiment of Figs. 2 and 3, the adjacent cross members 9 and 10 of the two elements coupled together are provided with coupling bars 11 and 12, respectively, connected together through a universal joint made as follows:

Bars 11 and 12 are provided at their ends with fork-shaped members 13, 14 carrying spindles 15, 16, respectively about which are pivotally, but not slidably, mounted collars 17, 18, coaxially mounted on a common pivot 19. This pivot 19 is carried by the coupling beam 20. Said beam 20 is provided, at its respective ends, with spherical portions 21 and 22. Spherical portion 21 is housed in a spherical socket 23, preferably made of two parts and carried by a sliding member 24. The latter can move, against the action of antagonistic springs 25, in a slideway provided in the frame 26 of one of the trucks, or in any other part, such as a truck bolster, for instance. The other spherical member 22 is mounted in the same manner with respect to the truck of the other vehicle.

Each of the vehicles rests on the truck that is located under it through springs 27 which bear upon shoes 28. These shoes are adapted to slide or roll upon tables 29 carried by the frame of the corresponding trucks. If rollers are interposed, it should be noted that the angular relative displacements of the car frame with respect to the truck amount to rocking or pivotal movements about a center on pivot 19; consequently it is preferred to set the axes of the rollers so that they meet pivot 19. Tables 29 may be provided on either side with inclined surfaces for limiting the lateral displacements or with stops such as elastic stops.

One of the coupling bars, 12 in the example shown by the drawings, is adapted to slide horizontally with respect to the frame of the corresponding vehicle and a spring 30 is interposed between a shoulder 31 of this bar and cross member 10.

Figure 4:
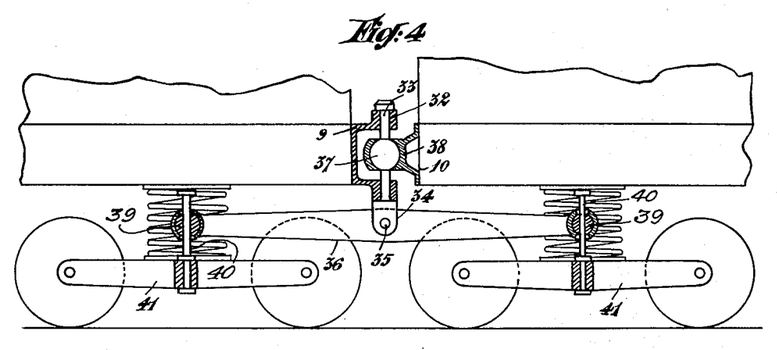
Fig. 4 is a view analogous to Fig. 2 corresponding to another embodiment of the coupling device according to the invention.

In the embodiment of Fig. 4, cross member 9 carries a stirrup 32 which supports a spindle 33 unable to slide. This spindle is provided at one end with a fork-shaped member 34 which is connected through a pivot 35 with the coupling bar 36, which is made in the manner of an equalizing bar. On the spindle 33 there is provided a spherical portion 37. This spherical portion may be either fixed, or capable to slide along spindle 33. On this spherical element there is mounted a socket 38 made of two parts, carried by the other cross member 10. The ends of equalizing bar 36 are adapted to turn about spherical members 39 adapted to slide along pivots 40 carried by the frames 41 of the trucks.

As above stated, the invention is also applicable to the case in which the vehicles are mounted on ordinary axles instead of trucks.

Figure 5:
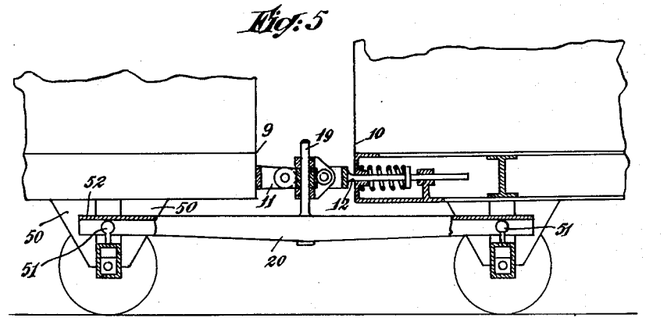
Fig. 5 is a view analogous to Fig. 2 showing an embodiment of the invention intended to be used in connection with vehicles mounted on simple axles.
Figure 6:
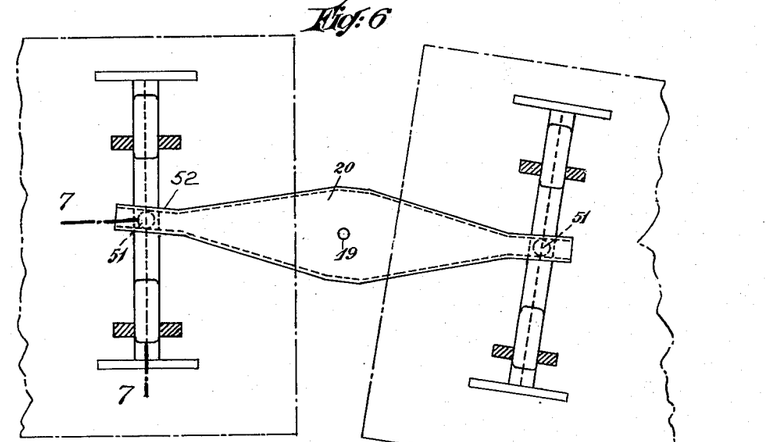
Fig. 6 is a plan view corresponding to Fig. 5.
Figures 7, 13:
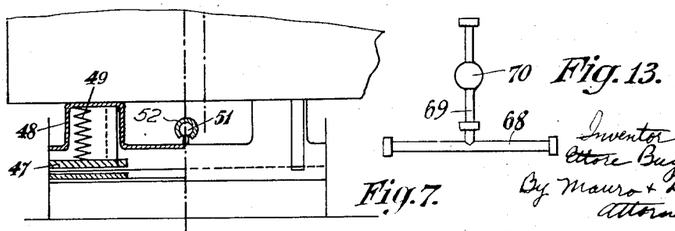
Fig. 7 is an end view of one of the vehicles of Figs. 5 and 6, partly in section on the line 8—8 of Fig. 6.
Fig. 13 is a front view showing separately the vertical guiding member.

Figs. 5, 6 and 7 show an embodiment of the invention corresponding to this case. The members that existed in the embodiments of Figs. 2 and 3 are designated in Figs. 5 to 7 by the same reference characters. Each of the axles is mounted in a casing 48 in which it can slide vertically. Two springs 49 may be interposed between axles 47 and casing 48. The casing is placed, as ordinary axle boxes, between the axle guards 50 carried by the frame of the vehicle. In its middle part said casing is connected with the coupling beam 20 through a ball and socket joint 51. As casing 48 can have only transverse displacements with respect to the frame, beam 20 is provided at both ends with slideways 52 in which are engaged spherical members 51, with a sliding fit. Fig. 6 shows the displacements that the different parts of the coupling device may undergo when the vehicles are running along a curve of the track.

Figure 8:
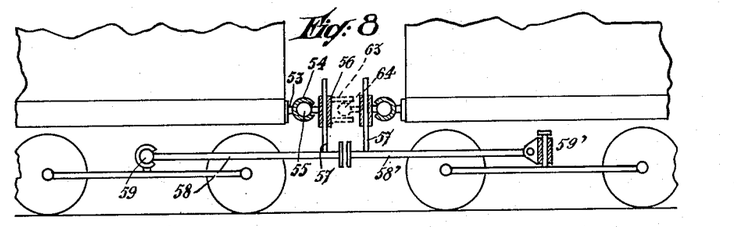
Figs. 8, 9 and 10 are views analogous to Fig. 2 of different coupling devices, respectively, including two guiding devices for the universal joints of the coupling bars.

It is not necessary that the coupling bars should be connected to a common universal joint. According to an embodiment of the invention, each of the vehicles may be provided with its respective universal joint. An example of such an embodiment is shown by Fig. 8. In this example, each coupling bar 53 carries a spherical socket 54, preferably made of two parts, in which is engaged a spherical element 55 of corresponding diameter. Each element 55 is rigidly connected to a tube 56 capable of sliding along a guiding rod 57. Rod 57 is carried by a bar or beam 58, which is connected, through a universal joint 59 or 59', with the frame of the truck or with the bolster thereof. The outer end of beam 58 may be coupled with the corresponding end of beam 58', mounted on another vehicle, in such manner as to form a composite coupling beam which is rigid in the transverse direction.

Owing to the construction which is diagrammatically shown in the drawings and which may of course differ in detail, two vehicles can easily be coupled together since it suffices to provide means for quickly assembling together the elements of the composite coupling beam. When the two vehicles have been uncoupled, each of them is capable of running at low speed, or even at any speed whatever if care has been taken to secure the truck in the transverse direction or to limit its displacements in this direction. This last mentioned condition is complied with if, as above explained, there is provided, on either side of the races 29, as above explained, stops or equivalent means.

Figure 9:
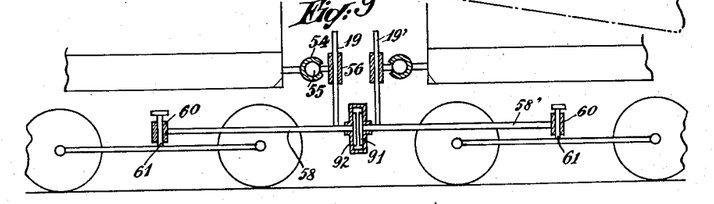

In Fig. 9, I have kept the same arrangement for the upper portion of the coupling device but the lower portion is slightly different. In this case, the coupling beam, consisting of the beam elements 58 and 58', is arranged in such manner that sockets 60 provided at the ends of these beam elements can only turn about the pivots 61 of the trucks.

Figure 10:
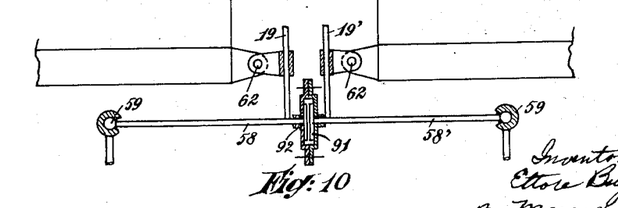

In the embodiment of Fig. 10, instead of ball and socket joints at the upper part of the coupling device, the connections are obtained through a single axis of pivotal movement 62, which is horizontal. In this case, ball and socket joints 59 are maintained on the trucks.

These diagrammatical views show:
1. That it is possible to provide absolutely identical pieces on both vehicles with a view to establishing the connection through automatic coupling means or through a coupling easy to bring into or out of action.
2. That the formation of a train with vehicles provided with the coupling device according to the present invention is easy to carry out.

They further indicate another manner of connecting together the two elements of the composite coupling beam.

These two elements 58 and 58', shown in these two figures are so assembled, in the case of Fig. 9, as to permit a relative rolling displacement of the two trucks that they connect together. In the case of Fig. 10, they are adapted to permit a transverse relative displacement of the bodies of the vehicles that are coupled together.

Each of the two beam elements 58 and 58' carries, at its free end, a disc 91. These two discs, placed upon each other, are surrounded by a common sleeve 92, made of two parts assembled together. With this arrangement, each of the beam elements, 58 or 58', can turn in this sleeve about the axis of the beam, while said beam remains rigid in the transverse direction. Consequently, rods 19 and 19' can be located in different planes passing both through the common axis of the beam elements. Consequently, the two trucks visible in Fig. 9 can be turned or rolled with respect to each other about their longitudinal axes. This would not be possible if the coupling beam was rigid.

Each rod 19 must be maintained parallel to the pivot 61 of the corresponding truck, so as to prevent it from inclining itself into a horizontal direction during the transverse movements of the body, because, in this case, it would no longer guide the end of said body. Guide 56 cannot perform this function since it is connected to the frame through ball and socket joint 54, 55 necessary for permitting relative rotary displacement of the body with respect to the pivot of the truck.

The same arrangement permits relative oscillatory displacements of the two bodies in the case of Fig. 10, the guiding rods 19 and 19' being maintained in a vertical plane at right angles to the axis 62 of their knuckle joint.

In the embodiments above described, the universal joints of the coupling bars of the two vehicles may, if so desired, be connected together in such manner that they cannot undergo relative displacements in the vertical direction. For this purpose, I may, as shown by Fig. 8, provide one of the joints with a cylindrical member 63 and the other one with a spherical member 64 of corresponding diameter.

Figure 11:
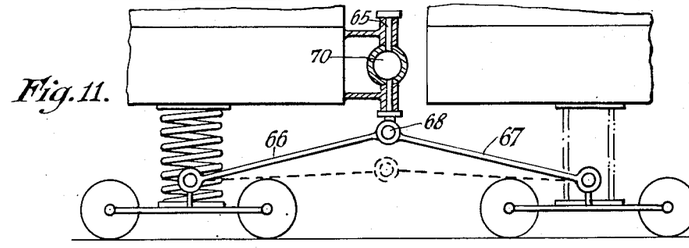
Fig. 11 is a view similar to Fig. 2 showing a modification.
Figures 12, 14, 22:
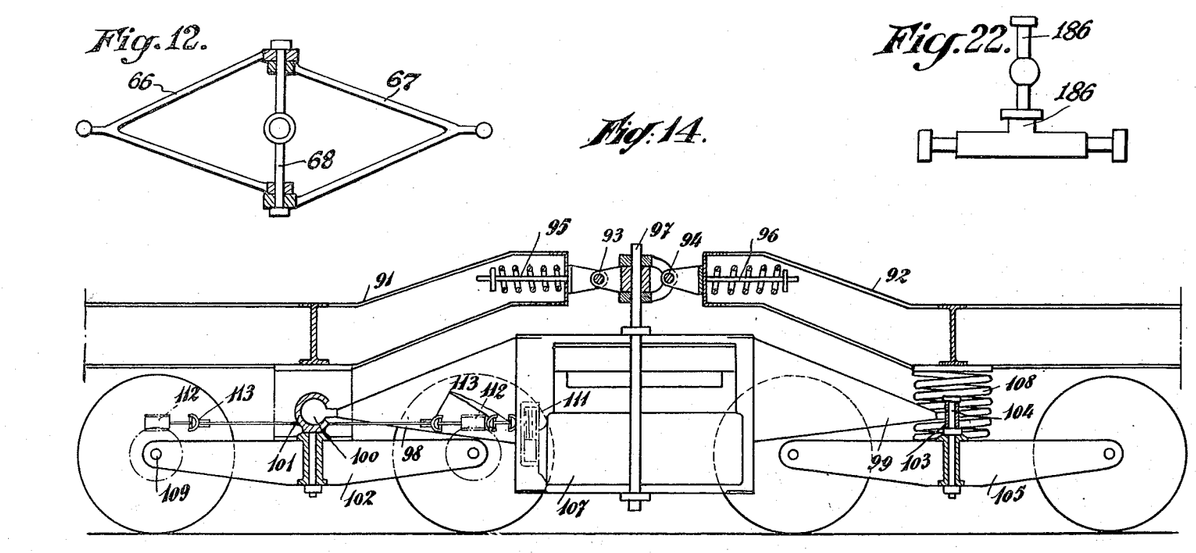
Fig. 12 is a plan view showing separately the coupling beam.
Fig. 14 is a longitudinal axial sectional view of two vehicles connected together through another embodiment of the coupling device according to the present invention.
Fig. 22 shows, separately, an element of the coupling device according to Figs. 20 and 21.
Figure 15:
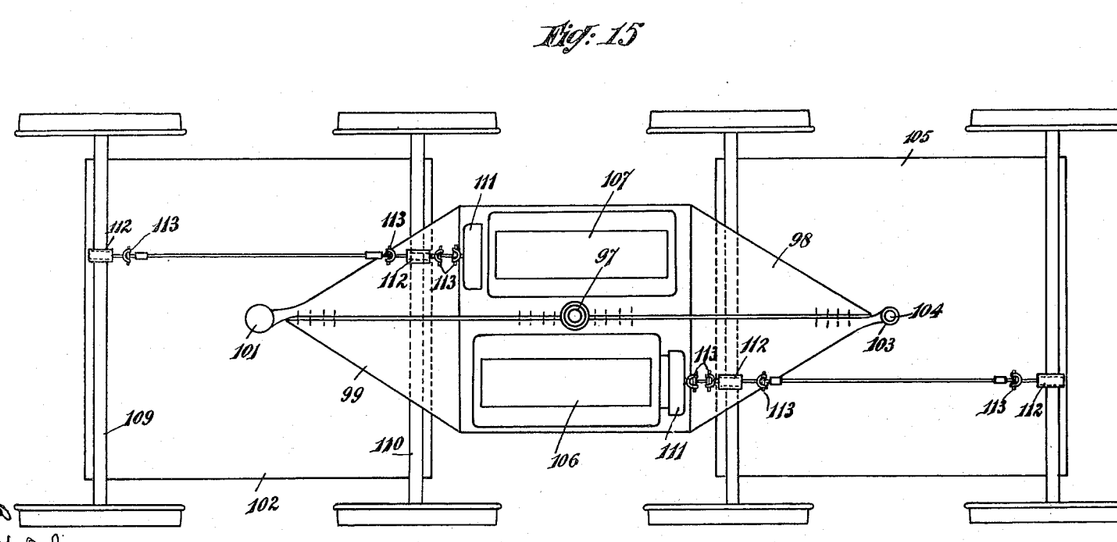
Fig. 15 is a plan view corresponding to Fig. 14, the frames of the vehicles having been removed.

As above stated, the beam that connects together the pivots of the two adjacent trucks or axles of the vehicles is rigid only in the transverse direction. It may, as shown by Figs. 11 to 13, be made of two portions articulated together about a transverse horizontal axis. In these figures, which disclose the use of a single universal joint, the whole of which is designated by reference number 65, the coupling beam is composed of two fork-shaped parts 66 and 67, which may be connected together through a transverse rod 68. This last mentioned rod may, as shown by Fig. 13, carry a rod 69 on which is mounted the spherical element 70 of the universal joint 65.

It will be readily understood that a certain number of the features described with reference to certain figures of the drawings apply also to embodiments described with reference to other figures. For instance, when there is provided a single universal joint for the coupling bars of the two vehicles to be coupled together, the device may be arranged in such manner that the frames of these vehicles can move vertically independently from each other. I may, for instance, for this purpose, provide a suitable play between the elements of the universal joint itself.

In the figures that will now be referred to (which are wholly diagrammatic) I have shown only the members that are necessary for explaining the invention.

In the embodiment illustrated by Fig. 14, the frames 91—92 of the two vehicles are connected together, as above, through coupling bars including articulations 93—94, the axes of which are disposed transversely to the track, and which can turn about rods 95—96. These joints 93—94 are assembled together through a central pivot 97 along which they may slide in the vertical direction.

Pivot 97 is supported by a coupling beam forming a box-like structure and made of two main parts 98—99. The coupling beam is provided at one end with a spherical member 100, adapted to cooperate with a corresponding spherical socket 101. This socket is carried by one of the trucks the frame of which is designated by reference number 102. The portion 99 of the coupling beam is provided at its end with a sleeve 103, coaxially mounted about a king-bolt 104 carried by a truck the frame of which is designated by reference number 105. The substitution of sleeve 103 for a ball and socket joint is intended to ensure that engines 106 and 107, carried by portions 98 and 99 of the coupling beam, may be maintained in a substantially vertical position, that is to say is intended to prevent the coupling beam from overturning on one side or the other. As it will be hereinafter explained any other arrangement giving the same result may be employed.

Frames 91 and 92 rest upon the corresponding trucks 102 and 105 respectively through a suitable suspension, for instance coil springs such as 108. The engine 107 drives axles 109—110 through a clutch 111 and gears 112, Cardan joints 113 being interposed at suitable places. The transmission shaft extending between gears 112 may, besides Cardan joints 113, include sliding portions which permit it to extend longitudinally in response to individual displacements of the axles with respect to the frame of the truck. The other engine 106 is mounted in the same manner as engine 107 with respect to the coupling gear.

Of course, for arranging the engines inside coupling beam 98—99, I may have recourse to all the arrangements known in the art, and, for instance, the engine may be elastically suspended, a hydraulic clutch may be utilized, etc. In a likewise manner all the improvements known in the art may be applied to the transmission connecting the wheels with the engine, the transmission indicated on the drawings being shown merely for illustrating purposes. Also in the drawings it has been assumed that the coupling beam was made of two parts substantially identical with each other located on either side of a median longitudinal plane of symmetry, and that the two engines were positioned symmetrically in this coupling beam, but these arrangements may be modified if so desired without departing from the principle of the invention.

Figure 16:
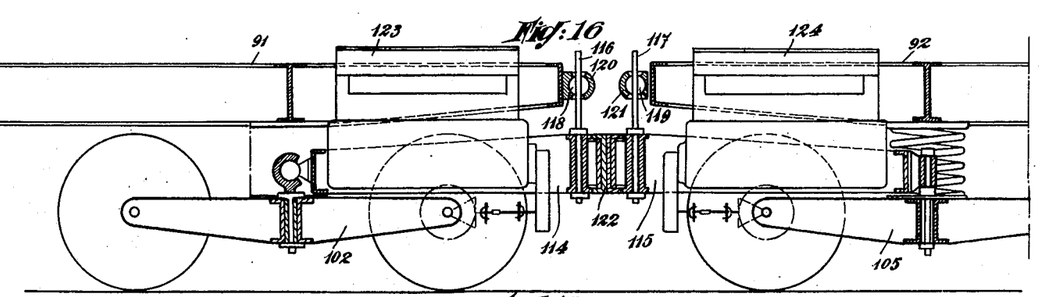
Figs. 16 and 17 are views analogous to Figs. 14 and 15, respectively, of another embodiment of the invention.
Figure 17:
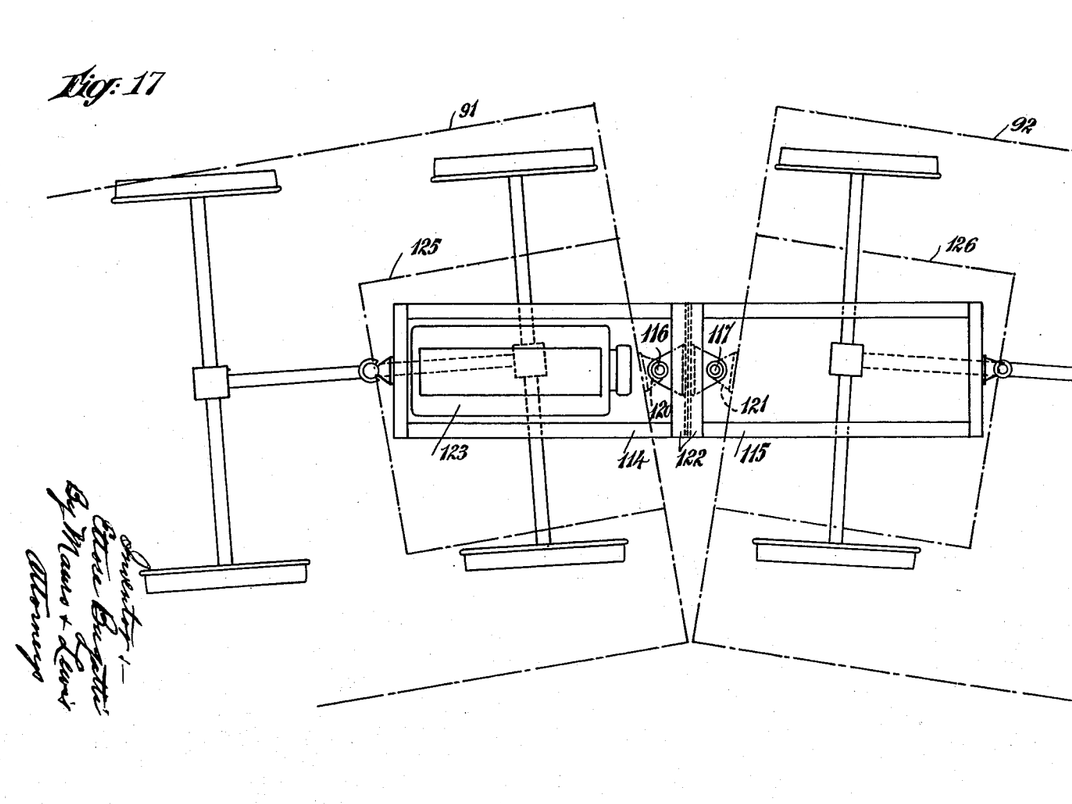

In the embodiment shown by Figs. 16 and 17, the coupling beam is given, as in the preceding embodiment, the shape of a rigid member made of two halves substantially identical with each other, but said halves are placed end to end, symmetrically with respect to a plane transverse to the track. The two portions 114 and 115 of this coupling beam carry two guiding rods 116 and 117, respectively, on which are slidably mounted spherical elements 118 and 119, respectively. These spherical elements are fitted in spherical sockets of corresponding diameters 120 and 121 carried by frames 91 and 92. The two portions of the coupling beam are assembled together through their adjacent ends at 122 in any suitable manner, for instance through quick coupling means such as described with reference to Figs. 9 to 11 and 18 or any known similar device. At its ends, the coupling beam is connected to trucks 102 and 105 as above described with reference to Figs. 14 and 15. The two halves 114 and 115 of the coupling beam carry the engine units 123 and 124 respectively. These engine units serve to drive the corresponding trucks 102 and 105. Under these conditions, if the two halves 114 and 115 of the coupling beam are separated from each other, two independent vehicles with their own engines are obtained, provided of course that care be taken to support the individual sections of the coupling member, for instance by means of a stop at the top of guiding rods 116 and 117.

Frames 91 and 92 must, as shown in dotted lines in 125 and 126 in Fig. 17, be provided with sufficiently large openings in order that engines 123 and 124 may have, with respect to their respective frames 91 and 92, the movements that result from the relative displacements of the trucks when the vehicles run along curves. If the engine control station and various accessory organs are to be placed close to the engine, I may, as it will be hereinafter described, provide a platform, disposed above each of the engines and resting, like them, upon the coupling beam. In this case, this platform will undergo, with respect to the frame of the vehicle, the same relative displacements as the engine.

Figure 18:
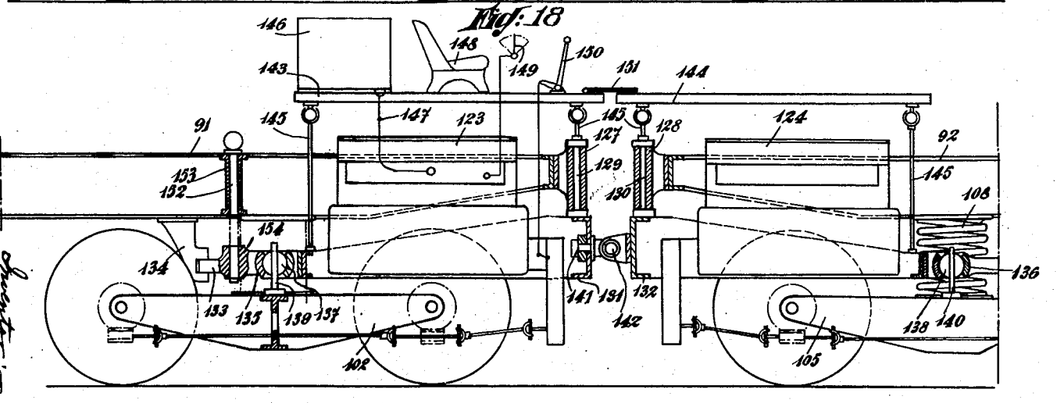
Figs. 18 and 19 are views analogous to Figs. 14 and 15, respectively, showing still another embodiment of the invention in which the weight of the motors or engines is supported by the frames of the vehicles.
Figure 19:
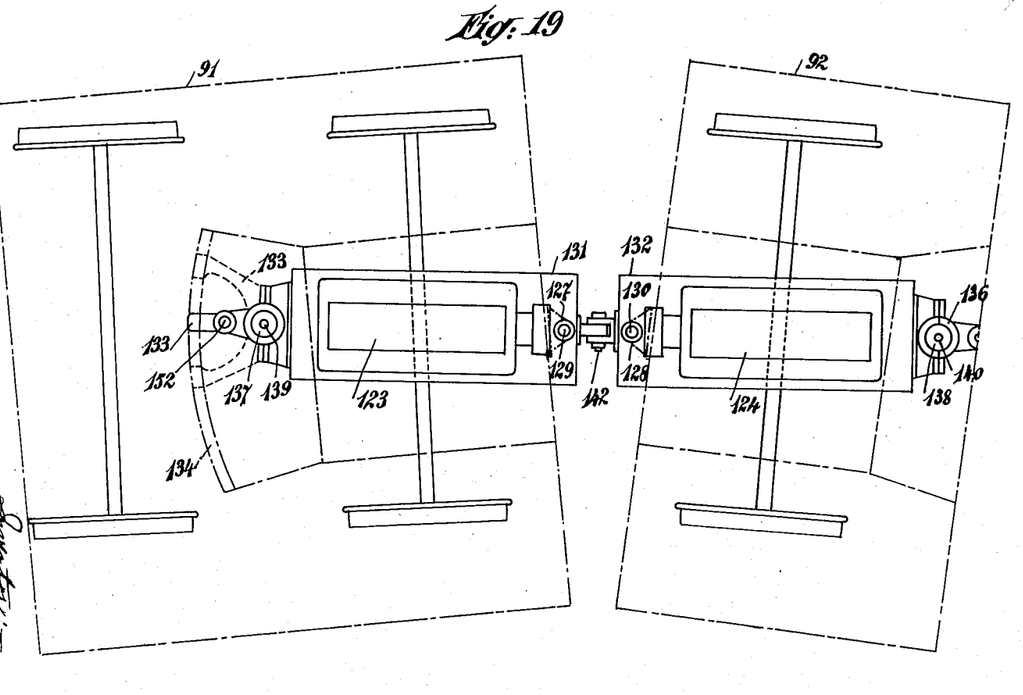

Figs. 18 and 19 show a slightly different coupling device. In this embodiment, the articulated coupling bars and the members for assembling the two halves of the coupling beam are partly merged together. The frames 91 and 92 carry, at their adjacent ends, two sleeves 127 and 128 in which can turn the spindles 129 and 130 carried by the two halves 131 and 132 of the coupling beam of the vehicles. This coupling beam 131—132 is connected to the frames 91—92 on the one hand through the spindles 129—130 just above mentioned, and on the other hand through parts 133 which are adapted to move in slideways 134 or similar members annexed to the frame. The two portions 131—132 of the coupling beam carry spherical sockets 135—136 adapted to receive corresponding spherical members 137—138 slidable along king-bolts 139—140 carried by trucks 102—105. Furthermore, the two portions of the coupling beam are connected together by a connecting system including two axes of articulation, one of which, 141, is longitudinal, while the other one 142 is disposed transversely. This connecting system is the only one that is to be uncoupled for separating the two vehicles from each other. As in preceding embodiments, the two portions of the coupling beam support the engines of the vehicles 123—124. It is clear that these engines are supported by the frame which, in turn, rests upon the trucks, for instance through springs 108. The engines drive the axles in any suitable manner, as above explained.

Fig. 18 further shows two platforms 143—144 respectively supported by the portions 131—132 of the coupling beam, through rods 145 or equivalent means provided at their upper ends with ball and socket joints. In the drawings, platform 143 supports a fuel tank 146 communicating with the engine through a pipe 147, the seat 148 of the driver, a hand lever 149 for controlling the throttle of the engine and a clutch lever 150. A movable plate 151 permits of establishing a communication between the two platforms. In this figure I have also shown a device for securing the beam element 131 in fixed position when disconnected from the other beam element 132, that is to say when the vehicle on the left hand side of the figure is separated from the vehicle on the right hand side. This fixation device includes a spindle 152 passing through a socket 153 carried by a frame 91 and engaging into a socket 154 carried by beam element 131.

Figures 20, 21:
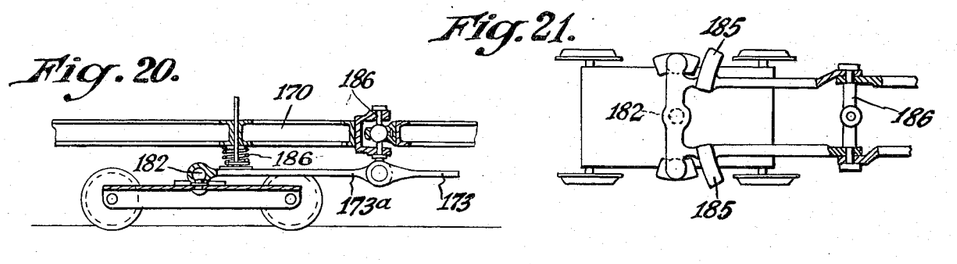
Figs. 20 and 21 are respectively a longitudinal sectional view and a plan view showing a portion of still another embodiment of the coupling device according to the present invention and the adjacent portions of the vehicles to be coupled together.

In Figs. 20 to 22, which have been simplified for the sake of clarity, the systems of rollers that are employed in actual practice have been replaced by mere sliding surfaces.

In Figs. 20 to 22, I have shown a jointed coupling member made of two parts 173ª, 173ᵇ assembled together through element 186 shown separately in Fig. 22. A coupling member of this kind has been described above. It has been supposed that frame 170 transmits its load through the intermediary of springs 186 and shoes 183 to tables 185 mounted on the portion 173ª of the coupling beam close to ball and socket joint 182.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. A device for coupling the adjacent ends of two railroad vehicles having adjacent end axles which support individually a part of the load of the corresponding vehicle body, each vehicle being provided with a coupling element, said device comprising a longitudinal coupling beam rigid in the transverse direction, pivoting means for attaching said longitudinal coupling beam to each of said adjacent end axles, said means being adapted to permit a relative pivoting movement at least about a vertical axis, means including a pivot pin for jointing universally the coupling elements of said vehicles, means for causing the vertical axis of said pivot pin to pass through a point of said beam which lies at an invariable distance from an end of said beam, intermediate the points of attachment of the same to said end axles, and means for holding said pivot pin in a substantially vertical position.

2. A device for coupling the adjacent ends of two railroad vehicles having adjacent end axles which support individually a part of the load of the corresponding vehicle body, which comprises a longitudinal coupling beam rigid in the transverse direction, pivoting means for attaching said longitudinal coupling beam to each of said adjacent end axles and means for attaching each vehicle end to the longitudinal beam, adapted to provide for pivotal movement of the corresponding vehicle end with respect to the longitudinal beam, at least about an axis disposed in a longitudinal vertical plane and passing through a point of the longitudinal beam which lies at an invariable distance from an end of said beam, intermediate the ends of the beam.

3. A device for coupling the adjacent ends of two railroad vehicles having adjacent end axles which support individually a part of the load of the corresponding vehicle body, which comprises means for jointing universally the two adjacent vehicle ends, adapted to transmit draft forces from a vehicle to the other vehicle and including at least one pivot pin, means for attaching said pivot pin to one of the vehicle bodies in a substantially vertical, laterally stationary position, and means rigid in the transverse direction for trailing the said adjacent end axles from said pivot pin.

4. A device for coupling the adjacent ends of two railroad vehicles having adjacent trucks which support individually a part of the load of the corresponding vehicle bodies, which comprises a coupling element for each vehicle body rigid with the same, means for jointing universally the two coupling elements including a substantially vertical pivot pin and adapted for permitting solely universal movement about a center on said pivot pin and a relative vertical displacement along said pin, a longitudinal rigid beam pivotally mounted on said pin so as to rock about a transverse axis with respect to the same, and means for jointing universally the longitudinal beam to each of said trucks, adapted to provide for vertical relative displacements of said beam along a stationary vertical axis in each truck.

5. In a combination of two vehicles having adjacent ends coupled through universally jointed coupling elements that are rigid with the corresponding vehicle bodies, a horizontal transverse pin mounted in a stationary position on one of the vehicle bodies, a longitudinally rigid beam pivotally mounted on said pin at a point intermediate its ends, a truck under each vehicle body in the vicinity of the said end thereof, a substantially vertical pivot in each truck, vertically sliding means for jointing universally the longitudinal rigid beam to each truck pivot, whereby the trucks are connected with the vehicle combination, and means for transferring load from each vehicle body to the corresponding truck disposed under it.

6. A device for coupling the adjacent ends of two railroad vehicles having adjacent end axles which support individually a part of the load of the corresponding vehicle body, which comprises a coupling element for each vehicle, rigid with the end of the corresponding vehicle body, means for jointing universally the adjacent coupling elements of the vehicles, including a substantially vertical pivot pin carried by one of said coupling elements, a two part longitudinal beam having its parts extending before and behind said pivot pin respectively, means for articulating said two parts of the longitudinal beam on said pivot pin about a transverse horizontal axis, and means for jointing universally one part of the beam to one of the said adjacent end axles and means for jointing universally the other part of the beam to the other end axle.

7. A device for coupling the adjacent ends of two railroad vehicles having adjacent end axles adapted to support individually a part of the load of the corresponding vehicle body, the bodies being coupled for universal relative movement about a center, said device comprising an articulated coupling structure disposed longitudinally between said adjacent end axles and including two successive rigid sections pivotally mounted upon a transverse rigid member, means for jointing universally one of the rigid sections to the adjacent end axle, means for jointing universally the other rigid section to the other end axle, and means including an upright pivot pin arranged to meet said center, for holding said rigid member from one of the vehicle bodies in a vertically stationary position with respect to said body.

8. A device for coupling the adjacent ends of two railroad vehicles having adjacent end axles adapted to support individually a part of the load of the corresponding vehicle body, which comprises for each vehicle a rigid beam section disposed longitudinally in a substantially horizontal position beneath one end of the vehicle body, a king-bolt on the corresponding end axle, means adapted to slide along said king-bolt for jointing universally said beam section to said end axles, an upright pivot pin rigid with said beam section, a bearing rigid with the corresponding vehicle body, engaging operatively said pivot pin, and articulated means for coupling the two beam sections into an articulated unitary beam, the last named means being arranged to preserve rigidity of said unitary beam in the transverse direction.

9. In a railroad vehicle having a body, the combination of an upright pin pivotally mounted at an end of said body, an elongated rigid structure forming with said upright pin a pivotal unit extending below said body towards the center thereof, a truck arranged beneath said body in the vicinity of said end thereof, means including a universal joint for attaching said structure to said truck at a point inwardly remote from said pin, and means for transferring load from said body to the truck, said structure being adapted for connection at its outer portion with the corresponding outer portion of similar structure in a similar vehicle, so as to form a beam rigid in the transverse direction.

10. In a railroad vehicle having a body, the combination of an elongated rigid structure extending below said body from one of the end portions thereof towards its center, means for connecting pivotally said structure at its outer end portion with the body, about a substantially vertical axis, said means being adapted to space the structure from the body by a substantially constant amount, a truck arranged beneath said body in the vicinity of said end thereof, means including a universal joint for attaching said structure to said truck at a point inwardly remote from the first named means, means operable at will for holding said structure against pivotment with respect to the vehicle body, and means for transferring load from the vehicle body to said truck.

11. A device for coupling the adjacent ends of two railroad vehicles having adjacent end trucks adapted to support individually a part of the load of the corresponding vehicle body, which comprises two rigid structures, one for each vehicle, detachably connected end to end so as to form a longitudinal coupling beam rigid in the transverse direction, means for attaching each of said rigid structures to the corresponding truck, adapted to provide for pivotal movement of said vehicle with respect to said rigid structure, at least about an axis disposed in a longitudinal vertical plane and passing through a point of the said structure which lies at an invariable distance from an end of said structure.

ETTORE BUGATTI.